United States Patent
Bourke

(10) Patent No.: US 10,084,878 B2
(45) Date of Patent: *Sep. 25, 2018

(54) SYSTEMS AND METHODS FOR HOSTED APPLICATION MARKETPLACES

(71) Applicant: SweetLabs, Inc., San Diego, CA (US)

(72) Inventor: Adrian Bourke, San Diego, CA (US)

(73) Assignee: SweetLabs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,755

(22) Filed: May 16, 2017

(65) Prior Publication Data

US 2017/0310784 A1    Oct. 26, 2017

Related U.S. Application Data

(63) Continuation of application No. 14/575,577, filed on Dec. 18, 2014, now Pat. No. 9,749,440.

(Continued)

(51) Int. Cl.
  *G06F 15/16* (2006.01)
  *H04L 29/08* (2006.01)
  *H04L 29/06* (2006.01)

(52) U.S. Cl.
  CPC ............ *H04L 67/30* (2013.01); *H04L 67/306* (2013.01); *H04L 67/34* (2013.01); *H04L 69/24* (2013.01)

(58) Field of Classification Search
  CPC ....... H04L 67/30; H04L 67/306; H04L 67/34; H04L 69/24

(Continued)

(56) References Cited

U.S. PATENT DOCUMENTS 5,021,949 A    6/1991 Morten et al.
5,548,704 A    8/1996 Steiner et al.
(Continued)

FOREIGN PATENT DOCUMENTS

| CN | 1322325 A | 11/2001 |
|---|---|---|
| CN | 102567511 A | 7/2012 |
| CN | 102685565 A | 9/2012 |
| CN | 105051686 A | 11/2015 |

(Continued)

OTHER PUBLICATIONS

Extended European Search Report for European Application No. 13847844.1 , Search completed Nov. 15, 2016, dated Nov. 24, 2016, 8 pgs.

(Continued)

*Primary Examiner* — Davoud Zand
(74) *Attorney, Agent, or Firm* — KPPB LLP

(57) ABSTRACT

Systems and methods for hosted application marketplaces in accordance with embodiments of the invention are described. In one embodiment, a hosted application marketplace server system includes a processor and a memory storing hosted application marketplace application, wherein the hosted application marketplace application directs the processor to obtain request data describing a request for hosted application data, wherein the request data includes user profile data and computing device capability data, identify a computing device based on the user profile data, determine compatible application data based on the request data, wherein the compatible application data identifies a set of applications that are compatible with the computing device based on the computing device capability data, generate hosted application data based on the compatible application data; and transmit the hosted application data in response to the obtained request data.

20 Claims, 9 Drawing Sheets

Related U.S. Application Data

(60) Provisional application No. 61/922,238, filed on Dec. 31, 2013.

(58) Field of Classification Search
USPC .............. 709/201, 202, 203, 212, 217, 219
See application file for complete search history.

(56) References Cited

U.S. PATENT DOCUMENTS

| | | |
|---|---|---|
| 5,848,396 A | 12/1998 | Gerace |
| 5,916,310 A | 6/1999 | McCain |
| 5,987,471 A | 11/1999 | Bodine et al. |
| 6,018,343 A | 1/2000 | Wang et al. |
| 6,023,698 A | 2/2000 | Lavey et al. |
| 6,094,671 A | 7/2000 | Chase et al. |
| 6,098,108 A | 8/2000 | Sridhar et al. |
| 6,115,039 A | 9/2000 | Karren et al. |
| 6,182,141 B1 | 1/2001 | Blum et al. |
| 6,216,141 B1 | 4/2001 | Straub et al. |
| 6,233,609 B1 | 5/2001 | Mittal |
| 6,282,567 B1 | 8/2001 | Finch, II et al. |
| 6,327,628 B1 | 12/2001 | Anuff et al. |
| 6,363,409 B1 | 3/2002 | Hart et al. |
| 6,456,307 B1 | 9/2002 | Bates et al. |
| 6,697,838 B1 | 2/2004 | Jakobson |
| 6,718,516 B1 | 4/2004 | Claussen et al. |
| 6,810,410 B1 | 10/2004 | Durham |
| 6,909,992 B2 | 6/2005 | Ashley |
| 6,959,320 B2 | 10/2005 | Shah et al. |
| 6,981,212 B1 | 12/2005 | Claussen |
| 6,992,589 B2 | 1/2006 | Marsh |
| 7,051,288 B2 | 5/2006 | Bennett et al. |
| 7,207,000 B1 | 4/2007 | Shen et al. |
| 7,272,786 B1 | 9/2007 | McCullough |
| 7,401,325 B2 | 7/2008 | Backhouse et al. |
| 7,614,018 B1 | 11/2009 | Ohazama et al. |
| 7,636,683 B1 | 12/2009 | Mills et al. |
| 7,681,134 B1 | 3/2010 | Grechishkin et al. |
| 7,734,583 B2 | 6/2010 | Vitanov et al. |
| 7,925,988 B2 | 4/2011 | Abernethy, Jr. et al. |
| 7,950,026 B1 | 5/2011 | Urbach |
| 7,996,785 B2 | 8/2011 | Neil |
| 8,046,672 B2 | 10/2011 | Hegde et al. |
| 8,176,321 B1 | 5/2012 | Perry et al. |
| 8,181,254 B1 | 5/2012 | Kay et al. |
| 8,209,598 B1 | 6/2012 | Pandey |
| 8,260,845 B1 | 9/2012 | Colton et al. |
| 8,296,643 B1 | 10/2012 | Vasilik |
| 8,296,684 B2 | 10/2012 | Duarte et al. |
| 8,335,817 B1 | 12/2012 | Dayan |
| 8,346,222 B2 | 1/2013 | Zubas et al. |
| 8,429,546 B2 | 4/2013 | Hilerio et al. |
| 8,434,135 B2 | 4/2013 | Hilerio et al. |
| 8,453,065 B2 | 5/2013 | Chaudhrl et al. |
| 8,458,612 B2 | 6/2013 | Chatterjee et al. |
| 8,555,155 B2 | 10/2013 | Harrison et al. |
| 8,566,697 B2 | 10/2013 | Meredith et al. |
| 8,613,070 B1 | 12/2013 | Borzycki et al. |
| 8,634,821 B2* | 1/2014 | Raleigh ............... H04L 41/0806 455/419 |
| 8,756,488 B2 | 6/2014 | Meredith et al. |
| 8,775,275 B1 | 7/2014 | Pope |
| 8,775,917 B2 | 7/2014 | Bourke et al. |
| 8,775,925 B2 | 7/2014 | Bourke et al. |
| 8,782,033 B2 | 7/2014 | Jiang et al. |
| 8,788,955 B2 | 7/2014 | Quine |
| 8,799,771 B2 | 8/2014 | Bourke et al. |
| 8,806,333 B2 | 8/2014 | Bourke et al. |
| 8,900,054 B2 | 12/2014 | Patel |
| 8,954,989 B1 | 2/2015 | Paul et al. |
| 9,021,469 B2 | 4/2015 | Posey et al. |
| 9,069,735 B2 | 6/2015 | Bourke et al. |
| 9,081,757 B2 | 7/2015 | Bourke et al. |
| 9,083,566 B1* | 7/2015 | Pearson ................. H04L 29/00 |
| 9,141,266 B2 | 9/2015 | McCormick et al. |
| 9,235,803 B2 | 1/2016 | Claux et al. |
| 9,268,466 B2 | 2/2016 | Momchilov et al. |
| 9,547,725 B2 | 1/2017 | Chu et al. |
| 9,628,574 B2 | 3/2017 | Bourke et al. |
| 9,749,440 B2 | 8/2017 | Bourke |
| 9,792,265 B2 | 10/2017 | Bourke et al. |
| 2001/0047394 A1 | 11/2001 | Kloba et al. |
| 2002/0109704 A1 | 8/2002 | Rajarajan et al. |
| 2002/0129064 A1 | 9/2002 | Guthrie |
| 2004/0019683 A1 | 1/2004 | Lee et al. |
| 2004/0081310 A1 | 4/2004 | Lueckhoff |
| 2004/0177327 A1 | 9/2004 | Kieffer |
| 2004/0205531 A1 | 10/2004 | Innes |
| 2004/0220926 A1* | 11/2004 | Lamkin ............. G06F 17/30017 |
| 2004/0221170 A1 | 11/2004 | Colvin |
| 2004/0268146 A1 | 12/2004 | Oberst et al. |
| 2004/0268225 A1 | 12/2004 | Walsh et al. |
| 2005/0005234 A1 | 1/2005 | Chen |
| 2005/0021977 A1 | 1/2005 | Oberst et al. |
| 2005/0027704 A1 | 2/2005 | Hammond et al. |
| 2005/0097522 A1 | 5/2005 | Backhouse et al. |
| 2005/0102374 A1 | 5/2005 | Moragne et al. |
| 2005/0108678 A1 | 5/2005 | Goodwin et al. |
| 2005/0210412 A1 | 9/2005 | Matthews |
| 2005/0223086 A1 | 10/2005 | Raverdy et al. |
| 2005/0273759 A1 | 12/2005 | Lucassen et al. |
| 2006/0005187 A1 | 1/2006 | Neil |
| 2006/0026438 A1 | 2/2006 | Stern |
| 2006/0031785 A1 | 2/2006 | Raciborski |
| 2006/0059422 A1 | 3/2006 | Wu et al. |
| 2006/0136964 A1 | 6/2006 | Diez et al. |
| 2006/0161631 A1 | 7/2006 | Lira |
| 2006/0224989 A1 | 10/2006 | Pettiross et al. |
| 2006/0265280 A1 | 11/2006 | Nakada et al. |
| 2007/0050777 A1 | 3/2007 | Hutchinson et al. |
| 2007/0061700 A1 | 3/2007 | Kothari et al. |
| 2007/0083356 A1 | 4/2007 | Brunet et al. |
| 2007/0244919 A1 | 10/2007 | Wells et al. |
| 2007/0245238 A1 | 10/2007 | Fugitt et al. |
| 2007/0255576 A1 | 11/2007 | Patterson |
| 2007/0255814 A1 | 11/2007 | Green et al. |
| 2007/0277109 A1 | 11/2007 | Chen et al. |
| 2007/0300068 A1 | 12/2007 | Rudelic |
| 2008/0021696 A1 | 1/2008 | Bartelt et al. |
| 2008/0040226 A1 | 2/2008 | Roker |
| 2008/0082565 A1 | 4/2008 | Chang et al. |
| 2008/0108333 A1 | 5/2008 | Jemison et al. |
| 2008/0120129 A1* | 5/2008 | Seubert ................. G06Q 10/06 705/35 |
| 2008/0140529 A1 | 6/2008 | Agarwal et al. |
| 2008/0154718 A1 | 6/2008 | Flake et al. |
| 2008/0172487 A1 | 7/2008 | Brunet et al. |
| 2008/0172736 A1 | 7/2008 | Barr et al. |
| 2008/0208589 A1 | 8/2008 | Cross et al. |
| 2008/0256636 A1 | 10/2008 | Gassoway |
| 2009/0019371 A1 | 1/2009 | Audet |
| 2009/0019436 A1 | 1/2009 | Hartz et al. |
| 2009/0025063 A1 | 1/2009 | Thomas et al. |
| 2009/0037452 A1 | 2/2009 | Baitalmal et al. |
| 2009/0037492 A1 | 2/2009 | Baitalmal et al. |
| 2009/0070228 A1 | 3/2009 | Ronen |
| 2009/0077174 A1 | 3/2009 | Janssen et al. |
| 2009/0125833 A1 | 5/2009 | Abernethy, Jr. et al. |
| 2009/0132556 A1 | 5/2009 | Gupta et al. |
| 2009/0171974 A1 | 7/2009 | Arthursson et al. |
| 2009/0171993 A1 | 7/2009 | Arthursson |
| 2009/0187928 A1 | 7/2009 | Mark |
| 2009/0216775 A1 | 8/2009 | Ratliff et al. |
| 2009/0217179 A1 | 8/2009 | Mons et al. |
| 2009/0249188 A1 | 10/2009 | Dube et al. |
| 2009/0249238 A1 | 10/2009 | Chudy et al. |
| 2009/0271394 A1 | 10/2009 | Allen et al. |
| 2009/0280907 A1 | 11/2009 | Larsen |
| 2009/0282333 A1 | 11/2009 | Olsen et al. |
| 2010/0017701 A1 | 1/2010 | Bargeron |
| 2010/0023582 A1 | 1/2010 | Pedersen et al. |
| 2010/0023855 A1 | 1/2010 | Hedbor et al. |
| 2010/0023884 A1 | 1/2010 | Brichford et al. |
| 2010/0054128 A1 | 3/2010 | O'Hern |

(56) References Cited

U.S. PATENT DOCUMENTS

| | | |
|---|---|---|
| 2010/0057884 A1 | 3/2010 | Brownell et al. |
| 2010/0094878 A1 | 4/2010 | Soroca et al. |
| 2010/0114887 A1 | 5/2010 | Conway et al. |
| 2010/0146529 A1 | 6/2010 | Heath et al. |
| 2010/0205523 A1 | 8/2010 | Lehota et al. |
| 2010/0211906 A1 | 8/2010 | Kanai |
| 2010/0228594 A1 | 9/2010 | Chweh et al. |
| 2010/0233996 A1 | 9/2010 | Herz et al. |
| 2010/0306762 A1 | 12/2010 | Lindberg et al. |
| 2010/0318608 A1 | 12/2010 | Huang et al. |
| 2011/0016169 A1 | 1/2011 | Cahill et al. |
| 2011/0041003 A1 | 2/2011 | Pattar et al. |
| 2011/0055005 A1 | 3/2011 | Lang |
| 2011/0093900 A1 | 4/2011 | Patel et al. |
| 2011/0099558 A1 | 4/2011 | Patrick et al. |
| 2011/0099627 A1 | 4/2011 | Proudler |
| 2011/0119571 A1 | 5/2011 | Decker et al. |
| 2011/0138295 A1 | 6/2011 | Momchilov et al. |
| 2011/0138314 A1 | 6/2011 | Mir et al. |
| 2011/0153806 A1 | 6/2011 | Bagasra |
| 2011/0173098 A1 | 7/2011 | Lee |
| 2011/0185354 A1 | 7/2011 | Tanner et al. |
| 2011/0209047 A1 | 8/2011 | Olsen et al. |
| 2011/0225178 A1 | 9/2011 | Ingrassia |
| 2011/0231280 A1 | 9/2011 | Farah |
| 2011/0238501 A1 | 9/2011 | Almeida |
| 2011/0282700 A1 | 11/2011 | Cockcroft |
| 2011/0289422 A1 | 11/2011 | Spivack et al. |
| 2011/0302510 A1 | 12/2011 | Harrison et al. |
| 2011/0302524 A1 | 12/2011 | Forstall |
| 2011/0307738 A1 | 12/2011 | Hilerio et al. |
| 2011/0307880 A1 | 12/2011 | Hilerio et al. |
| 2011/0307883 A1 | 12/2011 | Hilerio et al. |
| 2011/0307946 A1 | 12/2011 | Hilerio et al. |
| 2011/0314389 A1 | 12/2011 | Meredith et al. |
| 2012/0005346 A1 | 1/2012 | Burckart |
| 2012/0010995 A1 | 1/2012 | Skirpa et al. |
| 2012/0021774 A1 | 1/2012 | Mehta et al. |
| 2012/0030617 A1 | 2/2012 | Louch |
| 2012/0047442 A1 | 2/2012 | Nicolaou et al. |
| 2012/0054841 A1 | 3/2012 | Schultz et al. |
| 2012/0066583 A1 | 3/2012 | Priestley et al. |
| 2012/0066634 A1 | 3/2012 | Kim et al. |
| 2012/0079126 A1 | 3/2012 | Evans et al. |
| 2012/0084292 A1 | 4/2012 | Liang et al. |
| 2012/0084713 A1 | 4/2012 | Desai et al. |
| 2012/0096396 A1 | 4/2012 | Ording et al. |
| 2012/0131683 A1 | 5/2012 | Nassar et al. |
| 2012/0150963 A1 | 6/2012 | Horowitz et al. |
| 2012/0151368 A1 | 6/2012 | Tam |
| 2012/0166956 A1 | 6/2012 | Hilerio et al. |
| 2012/0166959 A1 | 6/2012 | Hilerio et al. |
| 2012/0173312 A1 | 7/2012 | Kern |
| 2012/0174075 A1 | 7/2012 | Carteri et al. |
| 2012/0179671 A1 | 7/2012 | Turner et al. |
| 2012/0233243 A1 | 9/2012 | Ashkenazy et al. |
| 2012/0235912 A1 | 9/2012 | Laubach |
| 2012/0246291 A1 | 9/2012 | Wong et al. |
| 2012/0266186 A1 | 10/2012 | Parzygnat |
| 2012/0278127 A1 | 11/2012 | Kirakosyan et al. |
| 2012/0290919 A1 | 11/2012 | Melnyk et al. |
| 2012/0290950 A1* | 11/2012 | Rapaport ............... H04L 51/32 715/753 |
| 2012/0291022 A1 | 11/2012 | Mehta et al. |
| 2012/0296959 A1 | 11/2012 | Momchilov et al. |
| 2012/0297291 A1 | 11/2012 | Fainberg et al. |
| 2012/0297377 A1 | 11/2012 | Chen et al. |
| 2012/0303801 A1* | 11/2012 | Raschke ............. H04L 12/2809 709/224 |
| 2012/0311419 A1 | 12/2012 | Kwak et al. |
| 2012/0323995 A1 | 12/2012 | Bourke et al. |
| 2012/0324338 A1 | 12/2012 | Meredith et al. |
| 2013/0024696 A1 | 1/2013 | Rudelic |
| 2013/0024763 A1 | 1/2013 | Nemati et al. |
| 2013/0024851 A1 | 1/2013 | Firman et al. |
| 2013/0073401 A1 | 3/2013 | Cook |
| 2013/0081081 A1 | 3/2013 | Wang |
| 2013/0111341 A1 | 5/2013 | Bier et al. |
| 2013/0111559 A1 | 5/2013 | Lomme et al. |
| 2013/0124211 A1 | 5/2013 | McDonough |
| 2013/0124557 A1 | 5/2013 | Goode et al. |
| 2013/0139146 A1* | 5/2013 | Bickle ............... G06F 17/30914 717/174 |
| 2013/0145348 A1 | 6/2013 | Agovic et al. |
| 2013/0160111 A1 | 6/2013 | Orr et al. |
| 2013/0173319 A1 | 7/2013 | Thomas et al. |
| 2013/0191242 A1 | 7/2013 | Daniel et al. |
| 2013/0191445 A1 | 7/2013 | Gayman et al. |
| 2013/0197972 A1 | 8/2013 | Taguchi et al. |
| 2013/0204975 A1 | 8/2013 | Keith, Jr. |
| 2013/0227646 A1 | 8/2013 | Haggerty et al. |
| 2013/0238999 A1 | 9/2013 | Helms et al. |
| 2013/0246906 A1 | 9/2013 | Hamon |
| 2013/0247030 A1 | 9/2013 | Kay et al. |
| 2013/0262168 A1 | 10/2013 | Makanawala et al. |
| 2013/0268837 A1 | 10/2013 | Braithwaite |
| 2013/0282798 A1 | 10/2013 | McCarthy et al. |
| 2013/0290879 A1 | 10/2013 | Greisson |
| 2013/0304581 A1 | 11/2013 | Soroca et al. |
| 2013/0304608 A1* | 11/2013 | Mehta ................ G06Q 30/0282 705/26.7 |
| 2014/0019958 A1 | 1/2014 | Sherman |
| 2014/0053107 A1 | 2/2014 | Patel |
| 2014/0068419 A1 | 3/2014 | Bourke et al. |
| 2014/0068420 A1 | 3/2014 | Bourke et al. |
| 2014/0068421 A1 | 3/2014 | Bourke et al. |
| 2014/0095886 A1 | 4/2014 | Futral |
| 2014/0114901 A1 | 4/2014 | Pradhan et al. |
| 2014/0172915 A1 | 6/2014 | Herbach et al. |
| 2014/0189546 A1 | 7/2014 | Hilerio et al. |
| 2014/0229520 A1 | 8/2014 | Scott et al. |
| 2014/0236756 A1 | 8/2014 | Bourke et al. |
| 2014/0250105 A1 | 9/2014 | Shankar |
| 2014/0258845 A1 | 9/2014 | Machado et al. |
| 2014/0297516 A1 | 10/2014 | Brown et al. |
| 2014/0325344 A1 | 10/2014 | Bourke et al. |
| 2014/0358657 A1 | 12/2014 | Smullen et al. |
| 2014/0365602 A1 | 12/2014 | Hillary et al. |
| 2014/0365962 A1 | 12/2014 | Lee et al. |
| 2015/0020126 A1 | 1/2015 | Kegel et al. |
| 2015/0051972 A1 | 2/2015 | Chweh et al. |
| 2015/0106801 A1 | 4/2015 | Agrawal et al. |
| 2015/0163549 A1 | 6/2015 | Suh et al. |
| 2015/0172374 A1 | 6/2015 | Chaudhry et al. |
| 2015/0186999 A1 | 7/2015 | Wei et al. |
| 2015/0188980 A1 | 7/2015 | Bourke |
| 2015/0331685 A1 | 11/2015 | Bourke et al. |
| 2015/0332287 A1 | 11/2015 | Arroyo et al. |
| 2016/0110066 A1 | 4/2016 | McCormick et al. |
| 2017/0147318 A1 | 5/2017 | Bourke |

FOREIGN PATENT DOCUMENTS

| | | |
|---|---|---|
| EP | 3090357 A1 | 11/2016 |
| HK | 1218968 | 3/2017 |
| HK | 1231208 A | 12/2017 |
| JP | 2004185083 A | 7/2004 |
| WO | 9952056 A1 | 10/1999 |
| WO | 2006120280 A1 | 11/2006 |
| WO | 2011160139 A1 | 12/2011 |
| WO | 2012154501 A2 | 11/2012 |
| WO | 2012177664 A1 | 12/2012 |
| WO | 2013074713 A1 | 5/2013 |
| WO | 2014025544 A1 | 2/2014 |
| WO | 2014035580 A2 | 3/2014 |
| WO | 2014130875 A1 | 8/2014 |
| WO | 2015103233 A1 | 7/2015 |

OTHER PUBLICATIONS

Extended European Search Report for European Application No. 14754141.1, Search completed Aug. 9, 2016, dated Aug. 18, 2016, 8 Pgs.

(56) References Cited

OTHER PUBLICATIONS

Extended European Search Report for European Application No. 14876001.0, Search completed Apr. 21, 201, dated May 5, 2017, 11 Pgs.
International Preliminary Report on Patentability for International Application PCT/US14/17806, Report Issued Aug. 25, 2015, dated Sep. 3, 2015, 4 Pgs.
International Preliminary Report on Patentability for International Application PCT/US2013/052042, Report Issued Feb. 10, 2015, dated Feb. 19, 2015, 10 Pgs.
International Preliminary Report on Patentability for International Application PCT/US2013/052562, Report Issued Mar. 3, 2015, dated Mar. 12, 2015, 4 Pgs.
International Preliminary Report on Patentability for International Application PCT/US2013/052861, Report Issued Apr. 21, 2015, dated Apr. 30, 2015, 7 Pgs.
International Preliminary Report on Patentability for International Application PCT/US2013/057087, Report Issued Mar. 3, 2015, dated Mar. 12, 2015, 10 Pages.
International Preliminary Report on Patentability for International Application PCT/US2014/072707, Report issued Jul. 5, 2016, dated Jul. 14, 2016, 4 Pgs.
International Search Report and Written Opinion for International Application No. PCT/US13/52042, International dated Jul. 25, 2013, Search Completed Dec. 13, 2013, dated Dec. 23, 2013, 12 pgs.
International Search Report and Written Opinion for International Application No. PCT/US2009/36069, date completed Jun. 23, 2009, dated Jul. 7, 2009, 8 pgs.
International Search Report and Written Opinion for International Application No. PCT/US2012/65136, International Filing Date Nov. 14, 2012, Search Completed Jan. 29, 2013, dated Feb. 8, 2013, 7 pgs.
International Search Report and Written Opinion for International Application No. PCT/US2013/052562, International Filing Date Jul. 29, 2013, Search Completed Jan. 30, 2014, dated Feb. 7, 2014, 5 pgs.
International Search Report and Written Opinion for International Application No. PCT/US2013/052861, International Filing Date Jul. 31, 2013, Search Completed Jan. 29, 2014, dated Feb. 21, 2014, 8 pgs.
International Search Report and Written Opinion for International Application No. PCT/US2013/057087, International Filing Date Aug. 28, 2013, Search Completed Feb. 27, 2014, dated Mar. 19, 2014, 10 pgs.
International Search Report and Written Opinion for International Application PCT/US2011/041129, Report completed Sep. 22, 2011, 15 pgs.
International Search Report and Written Opinion for International Application PCT/US2012/43189, International Filing Date Jun. 19, 2012, Report Completed Aug. 12, 2012, dated Sep. 4, 2012, 6 pgs.
International Search Report and Written Opinion for International Application PCT/US2014/072707, Report Completed Apr. 9, 2015, dated Apr. 24, 2015, 5 pgs.
Extended European Search Report for European Application EP09718357.8, report completed Oct. 2, 2014 dated Oct. 10, 2014, 5 Pgs., Oct. 10, 2014.
International Search Report and Written Opinion for International Application PCT/US14/17806, report completed May 28, 2014, dated Jun. 17, 2014, 5 Pgs.
"How to Use the Remote Shutdown Tool to Shut Down and Restart a computer in Windows 2000, published Jul. 5, 2006, pp. 1-2", printed from http://support.microsoft.com/kb/317371.
Davidyuk et al., "Context-Aware Middleware for Mobile Multimedia Applications", ACM 2004, pp. 213-220.
DLNA, "Overview and Vision White Paper", Jun. 2004, 16 pgs.
Heino et al., "Developing Semantic Web Applications with the OntoWiki Framework", Springer 2009, pp. 61-77.
Laufer, "A Hike through Post-EJB J2EE Web Application Architecture", IEEE, Computing in Science & Engineering, 2005, pp. 80-88.
Lee et al., "Integrating Service Composition Flow with User Interactions", 2008 IEEE International Symposium on Service-Oriented System Engineering, 2008, pp. 103-108.
Mikkonen et al., "Towards a Uniform Web Application Platform for Desktop Computers and Mobile Devices", Sun Microsystems, Inc., Oct. 2008, pp. 1-29.
Oren, "SemperWiki: A Semantic Personal Wiki", Proceedings of the 2005 International Conference on Semantic Desktop Workshop: Next Generation Information Management D Collaboration Infrastructure, vol. 175, Nov. 6, 2005, pp. 107-122.
Pokki, Download Free Desktop Apps and games. available at http://web.archive.org/web/20150105201753/https://www.pokki.com/, 3 pgs., Jan. 15, 2013.
Sen et al., "Feed Me: A Collaboration Alert Filtering System," ACM 2006, 11 pgs.
Stearn, "XULRunner: A New Approach for Developing Rich Internet Applications", IEEE Computer Society, May/Jun. 2007, pp. 67-73.
Sugawara et al., "A Novel Intuitive GUI Method for User-friendly Operation", Knowledge-Based Systems, vol. 22, 2009, pp. 235-246.

\* cited by examiner

SYSTEMS AND METHODS FOR HOSTED APPLICATION MARKETPLACES

CROSS-REFERENCE TO RELATED APPLICATIONS

The current application is a continuation of U.S. patent application Ser. No. 14/575,577, filed Dec. 18, 2014, entitled "Systems and Methods for Hosted Application Marketplaces" to Adrian Bourke, which claims priority to U.S. Provisional Patent Application No. 61/922,238, filed Dec. 31, 2013, entitled "Systems and Methods for Hosted Application Marketplaces" to Adrian Bourke, the disclosures of which are hereby incorporated by reference in their entirety.

FIELD OF THE INVENTION

The present invention is generally related to applications and more specifically to the distribution of applications that manage a user's interaction with web pages.

BACKGROUND

A runtime environment can enable an application to be integrated into the computing environment of a computing device. Typically, a runtime environment is provided for applications to be implemented natively (i.e. compiled into the machine code of the computing device on which it resides). However, other runtime environments can be provided for applications to be implemented non-natively on a computing device, such as web applications that can operate within a virtual machine provided by a web browser that operates natively on a computing device.

A web browser is an application that typically retrieves and presents information found on web pages maintained by content servers over a network. A web page is typically a file formatted in browser supported formats such as but not limited to markup languages (such as but not limited to HTML), scripts (such as but not limited to JavaScript) and style sheets (such as but not limited to CSS) that can be displayed by a web browser.

SUMMARY OF THE INVENTION

Systems and methods for hosted application marketplaces in accordance with embodiments of the invention are described. In one embodiment, a hosted application marketplace server system includes a processor and a memory storing hosted application marketplace application, wherein the hosted application marketplace application directs the processor to obtain request data describing a request for hosted application data, wherein the request data includes user profile data and computing device capability data, identify a computing device based on the user profile data, determine compatible application data based on the request data, wherein the compatible application data identifies a set of applications that are compatible with the computing device based on the computing device capability data, generate hosted application data based on the compatible application data; and transmit the hosted application data in response to the obtained request data.

DETAILED DESCRIPTION

Figure 1A:
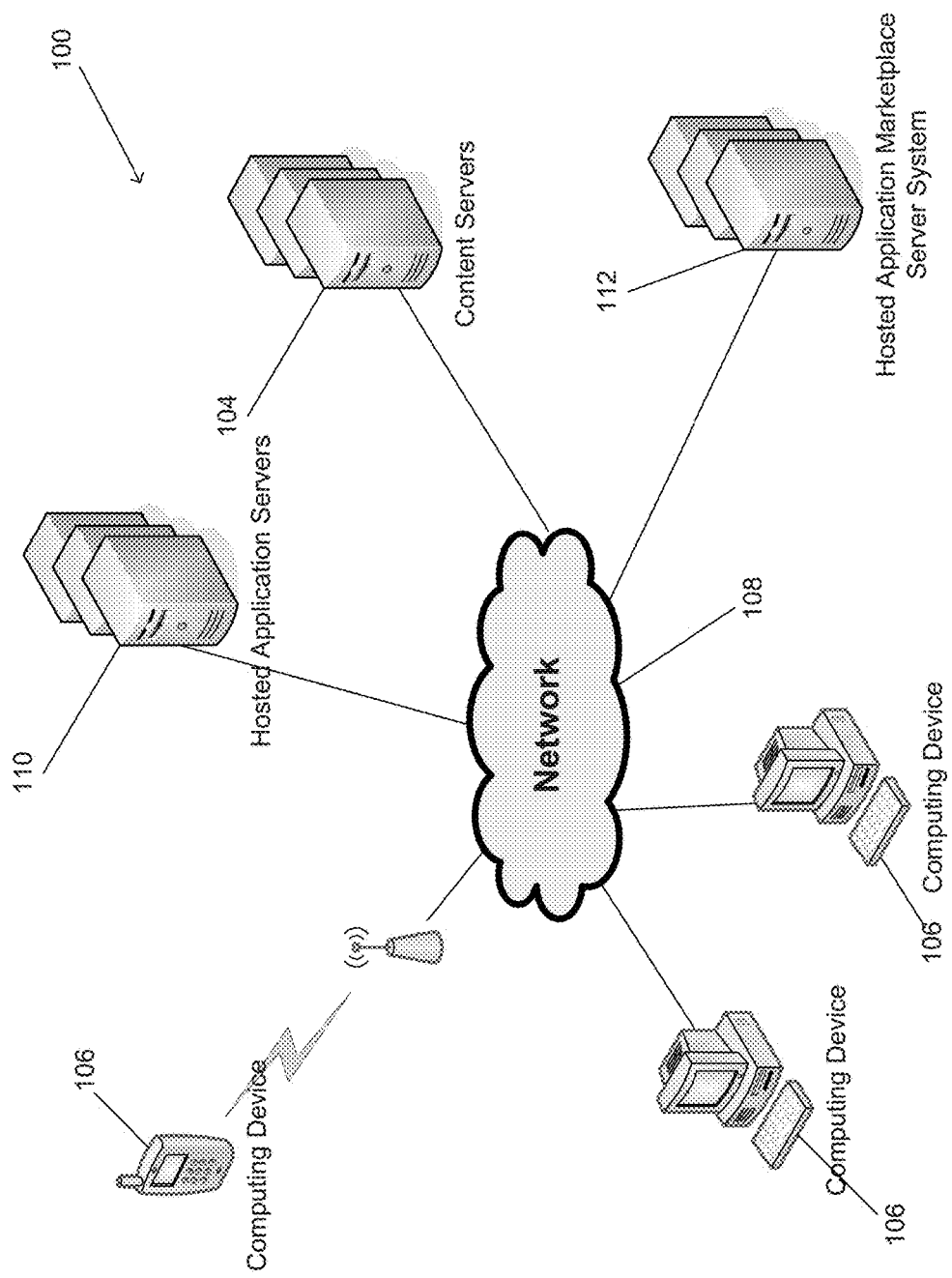
FIG. 1A is a network diagram illustrating a system that utilizes hosted applications and includes a hosted application marketplace server system in accordance with an embodiment of the invention.

Turning now to the drawings, hosted application systems including hosted application marketplaces in accordance with embodiments of the invention are illustrated. Hosted application systems provide an environment for the acquisition and execution of hosted applications. Hosted application marketplace server systems provide a marketplace for the storage, promotion, sale, and/or maintenance of hosted applications. Computing devices within a hosted application system are configured to obtain data describing hosted applications from the hosted application marketplace server system. By analyzing the capabilities of a computing device, hosted application marketplace server systems are configured to identify hosted applications that can be executed by the computing device. The capabilities of a computing device can include the hardware capabilities of the computing device and/or software (including hosted applications) associated with the computing device as described below. The hosted application marketplace server system is configured to generate data describing the identified hosted applications that can be utilized by the computing device to select one or more hosted applications to be acquired. In certain embodiments, the data describing the hosted applications is stored and transmitted using hosted application offer data. In a variety of embodiments, the hosted application offer data is tailored to the capabilities of the computing device displaying the hosted application offer data. In many embodiments, the hosted application offer data is tailored to allow for the comparative testing of a variety of presentations of the hosted application offer data across one or more computing devices. The identified hosted applications can be acquired via the hosted application marketplace server system and installed on the computing device. Once installed, the computing device can execute the hosted application utilizing techniques such as those described below. In a variety of embodiments, user profile data identifying one or more computing devices associated with a particular user is utilized by the hosted application marketplace server system to identify hosted applications that may be of interest to the user, thereby allowing for the targeting of hosted applications. Additionally, hosted application server systems can obtain hosted application requests associated with user profile data and push a hosted application (and/or the installer for a hosted application) to one or more computing devices associated with the user profile data as appropriate to the requirements of a specific application in accordance with embodiments of the invention.

In several embodiments, hosted application marketplace server systems host and/or provide references to hosted applications (and/or hosted application installer packages) and track user hosted applications based on received notification messages identifying a user hosted application. Hosted application marketplace server systems also receive hosted applications (and/or updates to hosted applications) and can push updates to hosted applications stored on one or more computing devices. Processes for tracking and updating hosted applications that can be utilized in accordance with embodiments of the invention are disclosed in U.S. patent application Ser. No. 14/012,653, titled "Systems and Methods for Tracking and Updating Hosted Applications" and filed Aug. 28, 2013.

Computing devices can be configured to execute hosted applications. In many embodiments, a runtime provided by an application platform enables the execution of a non-natively implemented hosted application. Application platforms that create a runtime environment in which non-natively implemented hosted applications can execute are discussed in U.S. patent application Ser. No. 13/164,740, filed Jun. 20, 2011 and titled "Systems and Methods for Integration of an Application Runtime Environment into a User Computing Environment." Systems, including hosted application server systems, and methods that can be utilized to host, recommend, and distribute hosted applications in accordance with embodiments of the invention are described in U.S. patent application Ser. No. 13/677,298, titled "Systems and Methods for User Configurable Recommendation Systems" and filed Nov. 14, 2012.

The disclosures of U.S. patent application Ser. Nos. 13/164,740, 13/677,298, and 14/012,653 are hereby incorporated by reference in their entirety. Systems and methods for hosted application systems configured to promote, distribute, and execute applications, including hosted applications that generate user interface pages from remotely hosted web pages, in accordance with embodiments of the invention are discussed below.

System Architecture

Hosted application marketplaces within hosted application systems are configured to promote and distribute hosted applications to a variety of computing devices. Hosted applications running on computing devices in accordance with many embodiments of the invention can manage user interactions derived from a remote web page formatted in a cross-platform language (e.g. a markup and/or scripting language supported by a web browser application) into a format suitable for display as a user interface page. In certain embodiments, the computing devices on which hosted applications execute within a runtime provided by an application platform can communicate via a network with content servers that maintain text files and content utilized by rendering engines in web browser applications to render web pages. In many embodiments, the text files contain instructions in markup languages and/or scripting languages that a web browser application interprets when formatting content for display. As the hosted application executes within the application platform, the hosted application derives user interface pages from the text files and content retrieved from the remote content servers. The user interface pages can then be rendered by a rendering engine within the application platform to provide a user interface for the hosted application.

A network diagram illustrating a system that utilizes hosted applications in accordance with an embodiment of the invention is illustrated in FIG. 1A. The system 100 includes a number of computing devices 106 connected to content servers 104 via a network 108, such as but not limited to the Internet. The content servers 104 maintain websites, including web pages and content that can be accessed by hosted applications running on computing devices 106. Within each computing device, hosted applications can execute within the runtime environment provided by an application platform and can access web pages from one or more content servers to generate user interface pages.

The hosted application marketplace server system 112 is configured to provide an online marketplace where computing devices 106 can browse and download hosted applications. In many embodiments, the hosted application marketplace server system 112 is configured to identify the capabilities of a computing device 106 and present hosted application offer data describing hosted applications that support the computing device 106. In a number of embodiments, the hosted application offer data is formatted for display based on the capabilities of the computing device 106. The hosted application marketplace server system 112 is further configured to obtain requests for hosted applications and distribute hosted applications. Hosted applications can be distributed directly, via an installer, and/or via a reference to a hosted application server 110 and/or a content server 104 as appropriate to the requirements of a specific application in accordance with embodiments of the invention. The hosted applications can be distributed to a computing device requesting the hosted application and/or a number of other computing devices. In several embodiments, the computing devices to which the hosted applications are distributed are identified using user profile data provided as part of the browsing and/or requesting of the hosted applications within the hosted application marketplace.

The computing devices 106 are connected to the hosted application servers 110 and the hosted application marketplace server system 112 via the network 108. The computing devices 106 can be configured to allow for the creation of user hosted applications based on remote web pages and/or websites provided by the content servers 104. The user hosted applications can create user hosted applications using a variety of techniques as appropriate to the requirements of a specific application in accordance with embodiments of the invention, such as by using a hosted application, a web browser application (or a plug-in/extension within the web browser application), and/or a native application running on the computing devices 106. In several embodiments, the hosted application servers 110 and/or content servers 104 provide an API allowing for the creation of user hosted applications for one or more remote web pages.

The hosted application servers 110 maintain a database of user hosted applications that are being tracked so that updates and/or hosted applications can be provided to the computing devices 106. The hosted application servers 110 obtain a hosted application and/or a reference to a hosted application related to the website(s) provided by the content servers 104 and identify user hosted applications running on one or more computing devices 106 that are associated with those website(s). In many embodiments, updates to hosted applications are also stored and/or referenced by the hosted application servers 110. The hosted application servers 110 are further configured to provide the hosted applications and/or hosted application updates (and/or a notification) to the computing devices 106 having the corresponding user hosted application. In several embodiments, the hosted application servers 110 and the hosted application marketplace server system 112 are implemented utilizing a single server system. In this way, the hosted application marketplace server system 112 not only provides a marketplace for the advertisement and distribution of hosted applications, but the system for storing, maintaining, and tracking of the hosted applications.

Although specific systems that utilize hosted applications are discussed above with respect to FIG. 1A, systems can utilize hosted applications in any manner as appropriate to the requirements of a specific application in accordance with embodiments of the invention. Furthermore, it should be noted that any data created and/or transferred within the system can be provided from any system in any manner (i.e. via one or more application programming interfaces (APIs) or web services) as appropriate to the requirements of specific applications of embodiments of the invention.

Computing Devices

Figure 1B:
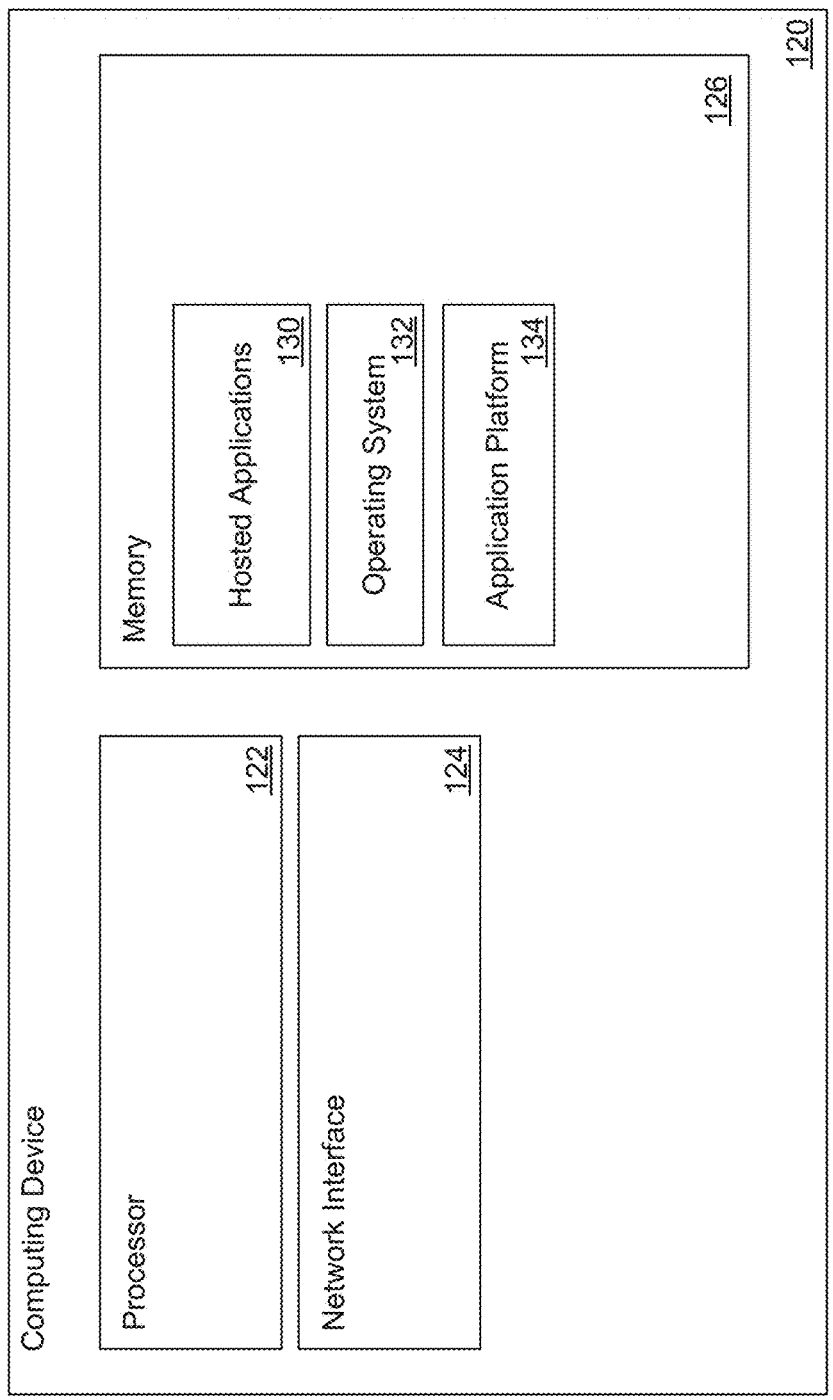
FIG. 1B is a conceptual illustration of a computing device configured to execute hosted applications in accordance with an embodiment of the invention.

In several embodiments, a runtime environment generated by an application platform is at least partially natively implemented and provides an intuitive user interface that is integrated with the computing environment of a device's operating system. A conceptual illustration of a computing device configured to execute hosted applications utilizing an application platform in accordance with an embodiment of the invention is shown in FIG. 1B. The computing device 120 includes a processor 122 connected to a network interface 124 and a memory 126. The network interface 124 is configured to send and receive data over a network connection. In a number of embodiments, the network interface 124 is in communication with the processor 122 and/or memory 126. In several embodiments, the memory 126 is any form of storage configured to store a variety of data, including, but not limited to, hosted application(s) 130, an operating system 132, and an application platform 134. In many embodiments, hosted application(s) 130, operating system 132, and/or application platform 134 are stored using an external server system and received by the computing device 120 using the network interface 124. External server systems in accordance with a variety of embodiments include, but are not limited to, hosted application servers, content servers, hosted application marketplace server systems, and other distributed storage services as appropriate to the requirements of specific applications in accordance with embodiments of the invention.

The application platform 134 can allow a user to access, organize, and discover applications, including hosted applications, which can execute within the runtime environment. In many embodiments, an application platform includes a rendering engine layer and an integration layer. The rendering engine layer includes various parsers and virtual machines associated with supporting specific web technologies including but not limited to HTML, JavaScript, and CSS. The integration layer exposes a number of Application Programming Interfaces (APIs) that can be called by a hosted application to make modifications to a user's computing environment. In several embodiments, the integration layer APIs are JavaScript APIs that can be called by a hosted application running within the application runtime environment created by the application platform. In response to the API calls, the integration layer can communicate with the operating system 132 and/or natively implemented processes to modify the user's computing environment.

A hosted application 130 can be implemented using a background page that generates at least one user interface page. User interface pages are generated locally using the logic of the background page, found within the hosted application's package stored on a computing device, and derived from a web page maintained by content servers over a network such as (but not limited to) the Internet. The background page is loaded locally at the time the hosted application is initiated from the hosted application's package and is defined in the hosted application manifest. A hosted application's package can include an application manifest, located in the root directory of the hosted application's package, to bootstrap the application into an application platform (such as but not limited to an application platform application) in order to share the resources of the application platform.

In many embodiments, the background page contains all of the logic of the hosted application. The logic of the hosted application can parse one or more remotely hosted text files that constitute a web page to determine the content of the text file(s). From a determination of the content of the text file(s), the logic of the background page can generate a user interface page derived from the remotely hosted web page by including or excluding content, markup, scripts, or style sheets in view of the remotely hosted web page. For example, the logic could cause exclusion of certain, text, pictures, sounds or animation, cause a change in the layout of content, preventing the loading of a pop up window, and/or changing the text font. In many embodiments, any of a variety of predetermined page modification rule can be applied that is capable of being expressed as a logical statement. In a number of embodiments, the logic can vary the layout of the content based on the computing device on which the hosted application is being executed. The logic can include or exclude content, markup, scripts or style sheets upon first accessing the web page as one or more text files maintained on a remote server (by modifying the instructions in markup and/or scripting language(s) contained within the text file(s)) and once again after building a Document Object Model (DOM) using the text files (by modifying the nodes or the text of the DOM). Furthermore, the inclusion of content, markup, scripts, or style sheets also includes the inclusion of application platform APIs, which can call for functions performed locally at the application platform or performed remotely at a remote server. The logic within the background page can also be used to generate notifications (such as pop-up notifications) that provide information to the user outside of the normal flow of the user interface pages. The background page can be implemented using one or more text files (as opposed to a binary executable file) that can include HTML, JavaScript and/or CSSs that the rendering engine layer of the application platform parses to implement the logic contained therein in a similar fashion to the way in which the rendering engine of a web browser application parses a conventional web page when enabling a web application on a computing device. In numerous embodiments, a background page can load JavaScript as the logic that conducts page flow control and injection of styling and functionality to the content and markup, CSS and JavaScript derived from a web page to generate a user interface page. In certain embodiments, a background page is formatted in a markup language, such as HTML, located within the hosted application's package. The JavaScript of the background page can be loaded locally or from a remote server and dynamically pulled as the application is launched.

An application platform can implement a user interface for a hosted application using instructions contained within a background page to generate user interface pages with content derived from web pages hosted on remote servers. In certain embodiments, a user interface page is generated according to the logic of the background page using a URL that enables retrieval of a web page from a remote server that can be rendered by the rendering engine of the application platform to create the user interface page based upon the content found using the URL. In numerous embodiments, a user interface page is generated by adding to and/or removing portions of the content along with the markup, scripts, and CSS retrieved from a web page before or as the user interface page is displayed. However, certain user interface pages may not require any modification in order to be rendered by the application platform. In certain embodiments, a user interface page is rendered by the application platform in response to a user selecting a link, such as a hyperlink or Uniform Resource Locator (URL). In response to the selection of a link, the hosted application can instruct the application platform to generate a user interface page using the web page identified by the link. In several embodiments, a user can interact with content derived from web pages as a controlled flow of user interface pages in an experience akin to how a user would experience content on a mobile application executing natively within an operating system such as (but not limited to) the iOS mobile operating system developed and distributed by Apple Inc. headquartered in Cupertino, California or the Android mobile operating system released by Google, Inc. headquartered in Mountain View, Calif. Thereby, a hosted application manages user interaction with remotely hosted web pages by generating user interface pages from the remotely hosted web pages according to instructions contained within a background page and/or obtained using the background page that control the flow from one user interface page to another.

Although computing devices configured to execute hosted applications are discussed above with respect to FIG. 1B, systems can utilize hosted applications in any manner as appropriate to the requirements of a specific application in accordance with embodiments of the invention. In a variety of embodiments, the memory 126 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices. The lifecycle of hosted applications in accordance with embodiments of the invention are discussed further below.

Hosted Application Lifecycles

Hosted applications in accordance with many embodiments of the invention locally manage a user's interactions by locally creating a user interface page derived from remote web pages. Hosted applications are configured to generate a user interface page according to instructions in a scripting language, such as (but not limited to) JavaScript, contained within a background page and/or obtained using the background page. The instructions within the background page dictates the injection or removal of content (such as but not limited to pictures, animation, sound or text), and the HTML, JavaScript and/or CSSs found within the text files maintained on a remote server to generate a user interface page. The background page is loaded upon hosted application initialization and remains active in the background so long as the hosted application is executing. The background page includes the logic used to generate user interface pages from web pages retrieved from a remote server that maintains the web pages. Executing the instructions generates instructions from which the rendering engine layer of the application platform can render the user interface page on a computing device and the integration layer of the application platform can integrate the user interface page with the functionality of the computing device. Thereby, a user interface page derived from a web page can present a user of the computing device with a controlled user experience, according to the logic of the background page executing from a hosted application's package locally stored on the computing device. For example, a hosted application can control the content with which a user can interact, such as by allowing or denying a user's access to content found on a particular web page (such as pop-up windows or particular images found on the web page).

User interface pages in accordance with embodiments of the invention can be generated from content and one or more text files containing instructions in markup and/or scripting languages capable of being rendered by a web browser application. The user interface pages are generated from the content and one or more text files according to the instructions of a background page that specifies the logic of a hosted application. A user interface page is generated by modifying the text that represents a web page by injecting and/or removing content, markup, style sheets and scripts from the retrieved web page according to the logic of the background page. Although in many embodiments a web page is remotely hosted, user interface pages may also be generated from one or more locally stored files including content, markup, scripts, and/or style sheets. Upon the generation of a user interface page, an application platform can integrate the user interface page with the computing environment of the computing device and render the user interface page in the foreground of the computing environment of a computing device for user interaction. In certain embodiments, the logic of the background page can generate a user interface page in accordance with the requirements of a specific application, such as (but not limited to) ensuring that a rendered user interface page can fit within a window of the hosted application's user interface.

The logic of the hosted application can parse the text file of a remotely hosted web page to generate a user interface page with particular content, markup, scripts, or style sheets. The inclusion of particular content, markup, scripts or style sheets also covers the inclusion of API calls including (but not limited to) API calls to the application platform and remote servers. A user interface page that includes particular content, markup, scripts, and/or style sheets can be generated by modifying the accessed web page first as a retrieved text file and/or second after building the DOM of the modified retrieved text file. The first modification of the accessed web page as a retrieved text file includes parsing the code of the retrieved text file to determine the content of the retrieved text file to determine the content, markup, scripts, and/or style sheets to include or exclude from a user interface page. Further modifications can occur after a DOM is built. In several embodiments, text or nodes are modified by including or excluding particular content, markup, scripts, or style sheets as nodes of a completed DOM.

Figure 1C:
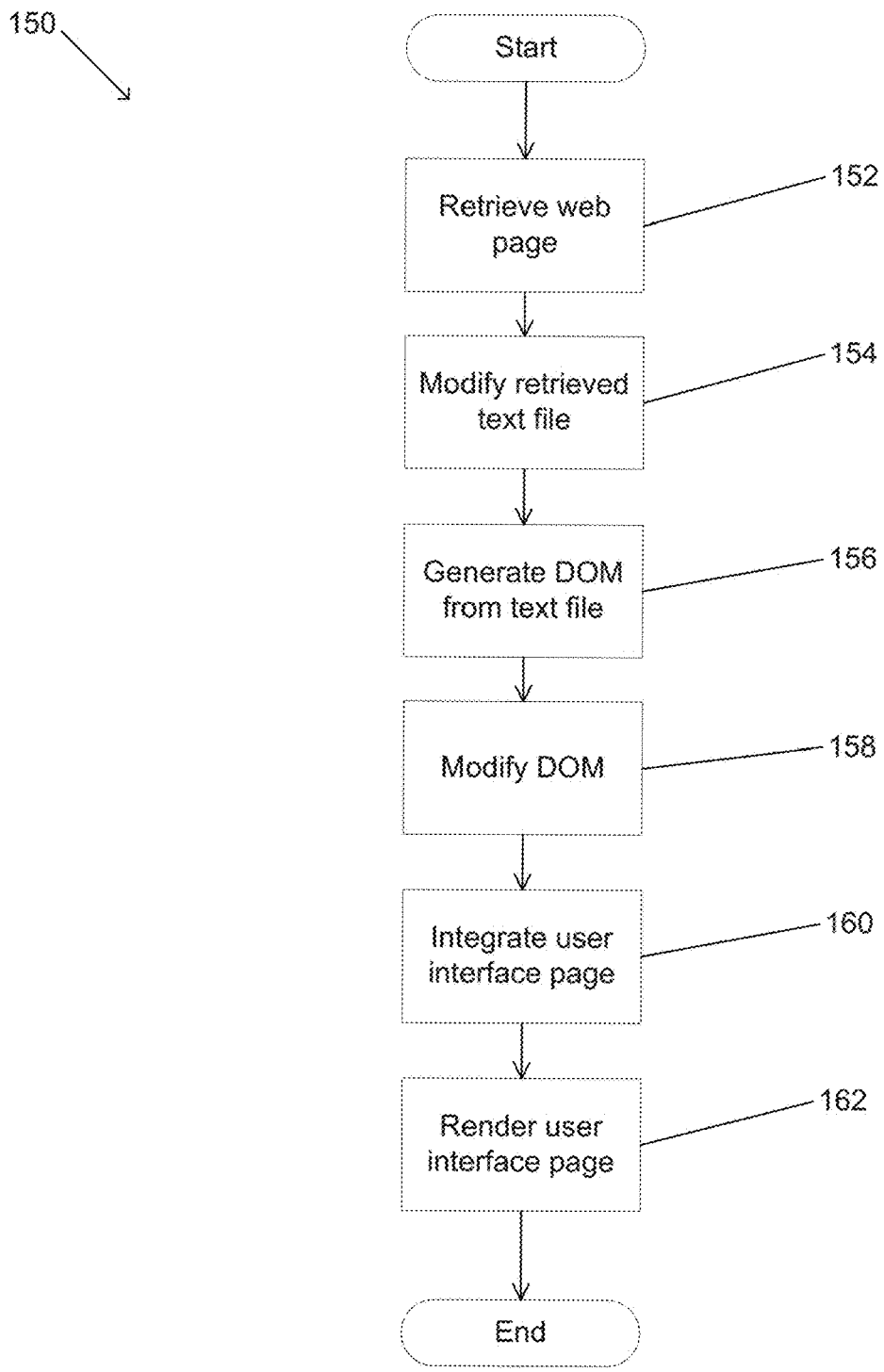
FIG. 1C is a flowchart of a process for executing hosted applications in accordance with an embodiment of the invention.

A process for generating a user interface page in accordance with an embodiment of the invention is illustrated in FIG. 1C. The process 150 includes retrieving (152) a web page. In many embodiments, a hosted application is provided (manually or automatically) with a URL from which one or more files associated with a web page can be retrieved (152). As noted above, the retrieved text files can include content with markup, scripts, and style sheets from which a typical web browser can render the web page. After retrieving (152) the text file, instructions within the background page determine the modifications (154) applied to the text file by modifying by injecting and/or removing content, markup, scripts, and/or style sheets. After modifying (154) the text file, a DOM representation of the text file is generated (156). Upon generating (156) the DOM, the DOM is modified (158) by injecting and/or removing content, markup, scripts and/or style sheets within the DOM. The application platform utilizes its integration and rendering engine layers to integrate (160) and render (162) the user application page.

In certain embodiments, the application platform can either remove or replace the code of a remote web page as particular nodes of a remote web page in a DOM, according to the logic of the background page. In certain embodiments, a node including window functions (such as "window.open") can be detected and fed into the logic of the background page. Thereby, the logic of the background page can make a decision as to how the window functions that imply modifications outside of the rendered user interface page (e.g. resizeTo/resizeBy) should influence the chrome that contains the rendered user interface page. The logic of the background page can replace the "window.open" code of opening a browser window by replacing it with a script for generating a user interface page using the details provided by the "window.open" code, such as (but not limited to) the URL of the web page to access while ignoring the other specifications such as a web browser window name, access to a menu bar, ability to resize the web browser window, and implementation of particular scrollbars, status bars and tool bars. Similarly, the logic can parse the text of a web page to determine if "window.resizeTo" or "window.resizeBy" or "window.close" code is present and remove or replace the code according to the logic of the background page.

In a variety of embodiments, the logic can incorporate custom style sheets (such as by adding style sheets when generating a user interface page's "head" node). In numerous embodiments, the logic of the background page can incorporate functionality by integrating scripts or calls for application platform APIs (such as but not limited to an API that enables resizing of a user interface page, for example to a default window size of 640×480 pixels). In a number of embodiments, the logic of the background page controls user interaction with the hosted application by disabling or adding functions traditionally present in a web browser. In certain embodiments, disabling or adding functions is accomplished by adding or removing various scripts or API calls that enable functionalities including (but are not limited to) the ability to cut, copy, paste, select all text, utilize a spell checker, resize a rendered web page or the ability to manually determine the flow of web pages (such as enabling a user to view web pages previously accessed, e.g. back and/or forward commands) rendered by a web browser.

In many embodiments, the logic of the background page can generate a user interface page at any time after accessing the remote web page from which the user interface page is generated, including prior to or after the DOM of the web page is loaded. In several embodiments, the logic of the background page can monitor the access of a web page (such as the download of one or more text files used to render a web page) during the generation of a user interface page and display a splash page while the user interface page is being generated. In certain embodiments, the download of one or more text files used to render a web page is reported back to the background page through a function where the body of the function returns an indication of progress as an integer between 0 and 100. In particular embodiments, the detection of an error in the download of one or more text files used to render a web page causes the background page to load a user interface page based upon an error detected through a function where the body of the function causes a particular user interface page to be displayed based upon a particular error.

Although specific processes for hosted application lifecycles including generating user interface page(s) are discussed above with respect to FIG. 1C, user interface pages may be generated according to any of a variety of process as appropriate to the requirements of a specific application in accordance with embodiments of the invention. Systems and methods for hosted application marketplaces in accordance with embodiments of the invention are described below.

Hosted Application Marketplace Server Systems

Figure 2:
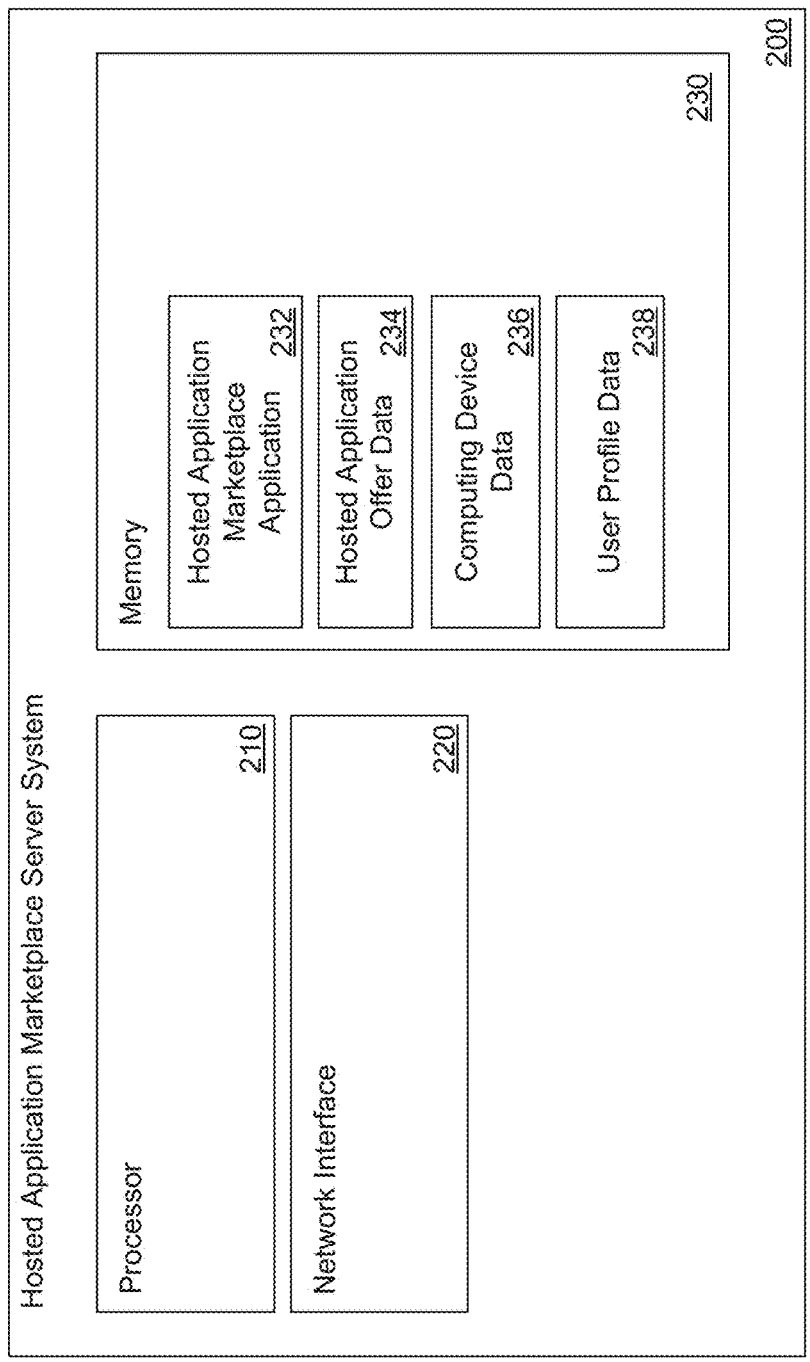
FIG. 2 is a conceptual illustration of a hosted application marketplace server system in accordance with an embodiment of the invention.

Hosted application marketplaces provide a place for application developers to advertise and distribute applications to a variety of users. In many embodiments, users are associated with one or more computing device and the hosted application marketplaces provides mechanisms for distributing selected hosted applications to one or more of the computing devices associated with the user. A conceptual illustration of a hosted application marketplace server system in accordance with an embodiment of the invention is illustrated in FIG. 2. The hosted application marketplace server system 200 includes a processor 210 connected to a network interface 220 and a memory 230. The network interface 220 is configured to send and receive data over a network connection. In a number of embodiments, the network interface 220 is in communication with the processor 210 and/or memory 230. In several embodiments, the memory 230 is any form of storage configured to store a variety of data, including, but not limited to, a hosted application marketplace application 232, hosted application offer data 234, computing device data 236, and user profile data 238. In many embodiments, hosted application distribution application 232, hosted application offer data 234, computing device data 236, and/or user profile data 238 are stored using an external server system and received by the hosted application marketplace server system 200 using the network interface 220. External server systems in accordance with a variety of embodiments include, but are not limited to, hosted application servers, content servers, and other distributed storage services as appropriate to the requirements of specific applications in accordance with embodiments of the invention.

The hosted application marketplace application 232 configures the processor 210 to execute a hosted application marketplace process. In many embodiments, a hosted application marketplace process includes obtaining a request for a portion of hosted application offer data 234 including a listing of hosted applications. In a variety of embodiments, the request includes computing device data 238 describing the capabilities of one or more computing devices. The request and/or computing devices can be associated with user profile data as appropriate to the requirements of a specific application in accordance with embodiments of the invention. Hosted applications are identified based on the request and identified hosted application offer data is transmitted. In several embodiments, the hosted application offer data includes metadata describing the hosted applications. The data can be customized based on the capabilities of the computing device utilizing techniques described below. The hosted application marketplace process further includes obtaining a request for a hosted application. In many embodiments, the request for a hosted application includes user profile data 238 and/or computing device metadata identifying one or more computing devices to transmit the requested hosted application. The hosted application (and/or an installer for) is distributed to the identified computing devices. In a variety of embodiments, the computing devices are identified using the capabilities of the computing device. These capabilities include, but are not limited to, the display resolution of the computing device, the processor contained in the computing device, the operating system installed on the computing device, and the applications (including hosted applications) associated with (e.g. installed on) the computing device. Other capabilities, including hardware capabilities not specifically mentioned above, can be utilized as appropriate to the requirements of a specific application in accordance with embodiments of the invention.

Although specific hosted application marketplace server systems are discussed above with respect to FIG. 2, any hosted application marketplace server systems, including those that host hosted applications and/or content referenced by hosted applications, can be utilized as appropriate to a specific application in embodiments of the invention. In a variety of embodiments, the memory 220 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices. Processes for distributing applications via hosted application marketplaces in accordance with embodiments of the invention are described in more detail below.

Distributing Applications via Hosted Application Marketplaces

Figure 3:
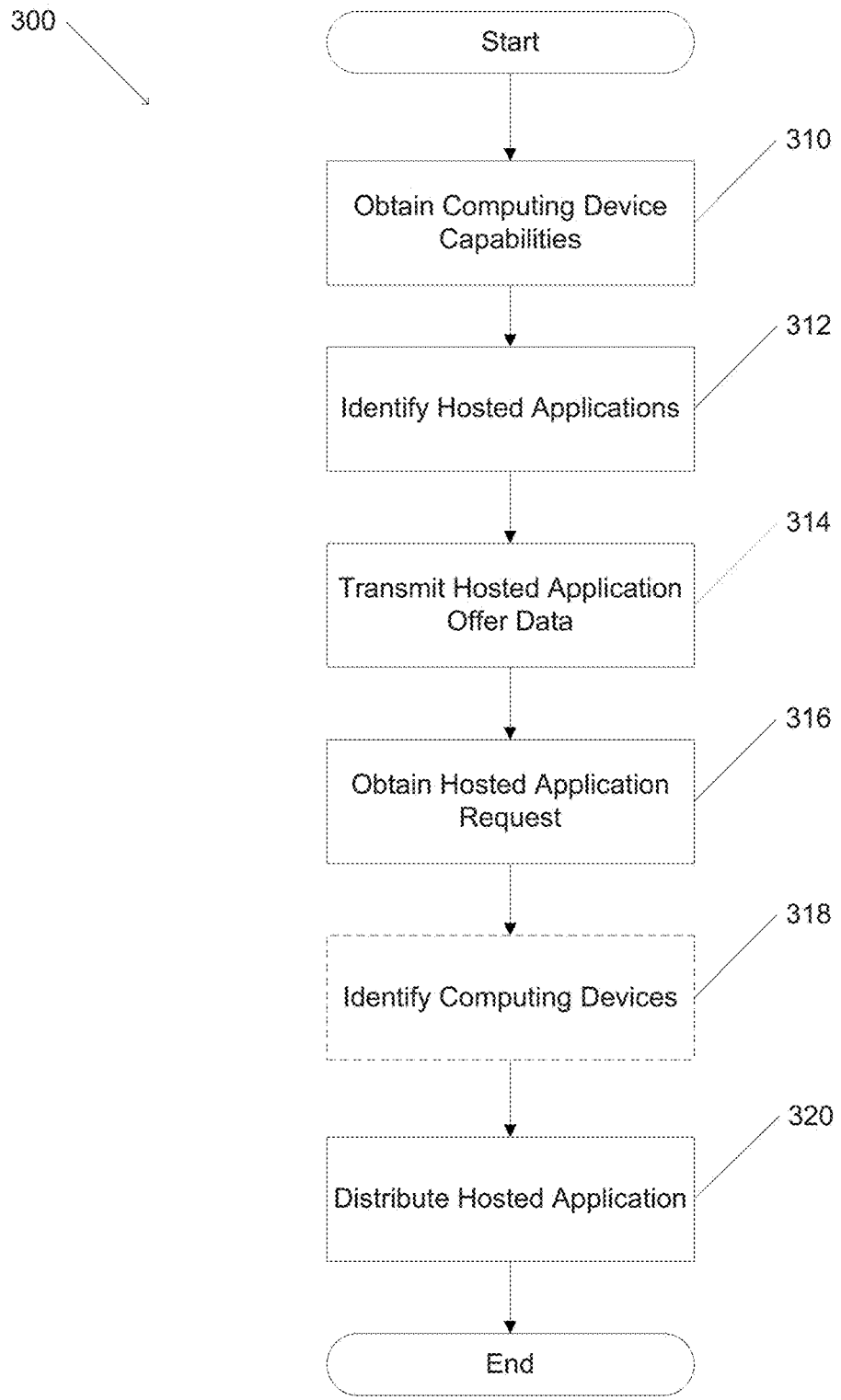
FIG. 3 is a flowchart of a process for distributing hosted applications in accordance with an embodiment of the invention.

Users can utilize hosted application marketplaces to peruse and install a variety of hosted applications on computing devices associated with the user. In several embodiments, the hosted application marketplace is configured to identify hosted applications that may be of interest to the user and/or can be executed on computing devices associated with the user. Hosted application marketplace server systems in accordance with embodiments of the invention are configured to provide hosted application marketplaces that distribute hosted applications to a variety of users and devices. A process for distributing applications via a hosted application marketplace in accordance with an embodiment of the invention is conceptually illustrated in FIG. 3. The process 300 includes obtaining (310) computing device capabilities. Hosted applications are identified (312) and hosted application offer data is transmitted (314). A hosted application request is obtained (316). In a variety of embodiments, computing devices are identified (318). Hosted applications are distributed (320).

In several embodiments, computing device capabilities are obtained (310) from a computing device. In a variety of embodiments, computing device capabilities are obtained (310) as metadata included in user profile data. In many embodiments, hosted applications are identified (312) based on the obtained (310) computing device capabilities. Hosted application offer data includes metadata describing the identified (312) hosted applications. The metadata includes, but is not limited to, operating systems supported by the hosted application, content servers associated with the hosted application, a monetary value associated with the hosted application, the publisher of the hosted application, a geographic market in which the hosted application is to be distributed, image data and/or audio data representing the hosted application, and any other data describing a hosted application as appropriate to the requirements of a specific application in accordance with embodiments of the invention. The hosted application offer data is transmitted (314) to one or more computing devices. In many embodiments, the computing devices obtaining the transmitted (314) hosted application offer data are configured to display the hosted application offer data based on display metadata contained within the hosted application offer data.

The obtained (316) hosted application request identifies one or more hosted applications. In a number of embodiments, the obtained (316) hosted application request includes metadata taken from the transmitted (314) hosted application offer data. In several embodiments, one or more computing devices are identified (318) based on the capabilities of the computing device(s). In a variety of embodiments, the identified (318) computing devices have capabilities that are compatible with the requested hosted application(s) as described by the metadata associated with the requested hosted applications. In many embodiments, the requested hosted application is distributed (320) to at least one of the identified (318) computing devices. The requested hosted application can be distributed (320) directly to the computing devices and/or an installer for the hosted application can be distributed (320) as appropriate to a specific application in accordance with embodiments of the invention. In several embodiments, different versions of a hosted application tailored to the capabilities of particular computing devices can be distributed (320). Similarly, a combination of hosted applications and hosted application installers can be distributed (320) to the identified (318) computing devices as appropriate to the requirements of a specific application in accordance with embodiments of the invention.

Although specific processes for distributing applications via hosted application marketplaces are discussed above with respect to FIG. 3, a variety of processes, including those that distribute applications other than hosted applications, can be utilized as appropriate to a specific application in embodiments of the invention. Processes for requesting and transmitting hosted applications in accordance with embodiments of the invention are described in more detail below.

Requesting Hosted Applications

Figure 4:
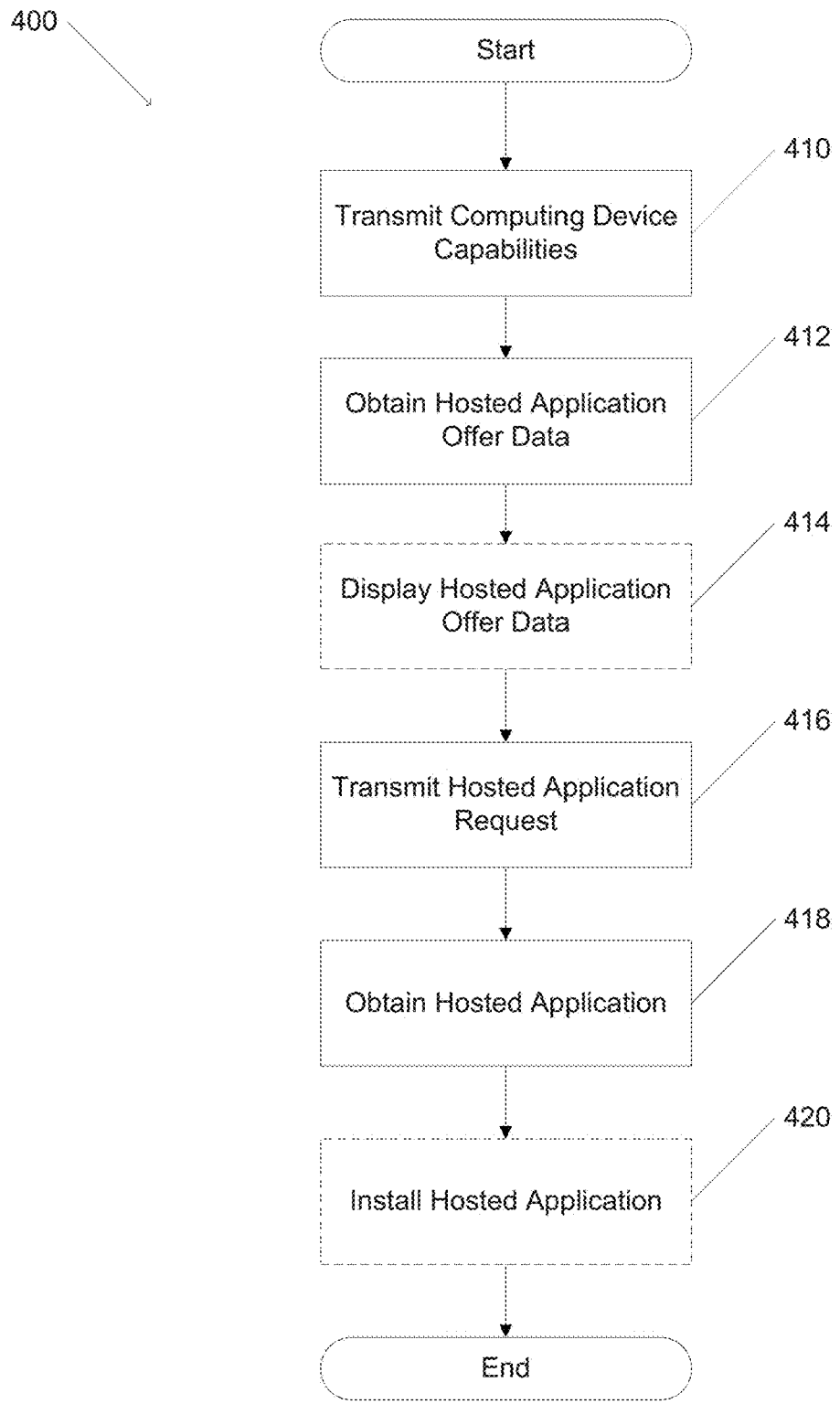
FIG. 4 is a flowchart of a process for requesting a hosted application in accordance with an embodiment of the invention.

Computing devices in accordance with embodiments of the invention are capable of executing a variety of hosted applications. The particular hosted applications that can be executed on a computing device are typically determined based on the capabilities of the computing device and/or restrictions imposed by the hosted application developer and/or distributor of a specific type of computing device. Computing devices in accordance with embodiments of the invention can be configured to request and obtain hosted applications. A process for requesting one or more hosted applications in accordance with an embodiment of the invention is conceptually illustrated in FIG. 4. The process 400 includes transmitting (410) computing device capabilities. Hosted application offer data is obtained (412) and, in several embodiments, hosted application offer data is displayed (414). A hosted application request is transmitted (416). A hosted application is obtained (418) and, in a number of embodiments, a hosted application is installed (420).

The transmitted (410) computing device capabilities includes metadata describing the capabilities of one or more computing devices as described above. In many embodiments, computing device capabilities are transmitted (410) using a network interface. In several embodiments, the transmitted (410) computing device capabilities includes user profile data. The obtained (412) hosted application offer data includes metadata describing one or more hosted applications that are compatible with the transmitted (410) computing device capabilities. In many embodiments, the obtained (412) hosted application offer data includes display metadata describing the manner in which the obtained (412) hosted application offer data should be displayed (414) on a computing device. The display metadata can include a variety of instructions in one or more languages, including Hypertext Markup Language (HTML), JavaScript, and the Extensible Markup Language (XML), although any language can be utilized as appropriate to a specific application in embodiments of the invention. In certain embodiments, the display metadata is capable of being executed within the virtual machine of an application platform executing within the operating system environment of a computing device. In a number of embodiments, the display (414) of the hosted application offer data as described in the display metadata is configured to be interpreted (and thereby executed) based on the capabilities of the computing device, where the same display metadata is distributed to a variety of computing devices. In several embodiments, the display (414) of the hosted application offer data is performed within a hosted application and the display of the hosted application offer data depends on the portion of the hosted application displaying the hosted application offer data. The hosted application offer data displayed (414) on the computing device can be stored on the computing device and/or streamed from the hosted application marketplace server system as appropriate to a specific application in embodiments of the invention.

In a variety of embodiments, the transmitted (416) hosted application request includes application metadata describing at least a portion of the obtained (412) hosted application offer data. Other metadata, including user profile data and computing device capabilities, can also be included in the transmitted (416) hosted application request as appropriate to a specific application in embodiments of the invention. In several embodiments, user profile data includes, but is not limited to, metadata describing at least one computing device associated with a user. The user profile data can also include authorization metadata describing relationships between the user profile data, the computing devices, and the ability to request (and/or install) hosted applications on the computing devices. In a number of embodiments, the obtained (418) hosted application corresponds to the transmitted (416) hosted application request. In many embodiments, the obtained (418) hosted application is installed (420) using an application platform executing within a computing environment created by an operating system on the computing device. In a variety of embodiments, the obtained (418) hosted application is an installer for the requested (416) hosted application and the hosted application is installed (420) using the installer.

Although specific processes for requesting hosted applications are discussed above with respect to FIG. 4, a variety of processes, including those that request applications other than hosted applications, can be utilized as appropriate to a specific application in embodiments of the invention. Processes for identifying and transmitting hosted applications in accordance with embodiments of the invention are described in more detail below.

Determining Compatible Hosted Applications

Figure 5:
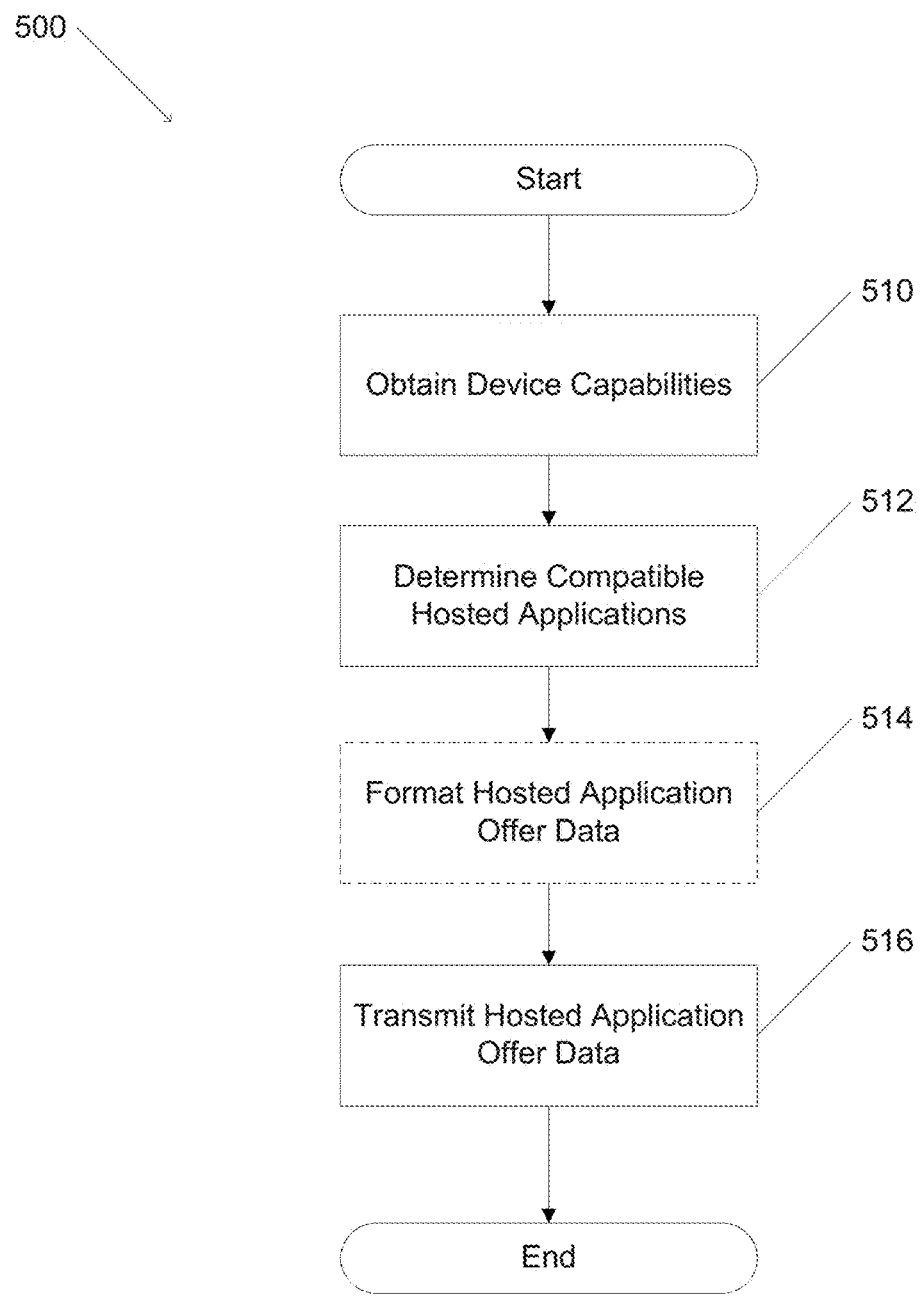
FIG. 5 is a flowchart of a process for determining compatible hosted applications in accordance with an embodiment of the invention.

As discussed above, hosted applications can be compatible with one or more computing devices, either directly or by providing multiple versions of the hosted application tailored to the capabilities of each computing device. Hosted application marketplaces are configured to identify a set of hosted applications based on the capabilities of one or more computing devices. Hosted application marketplace server systems in accordance with embodiments of the invention are configured to identify hosted applications and transmit hosted application offer data. A process for determining compatible hosted applications in accordance with an embodiment of the invention is conceptually illustrated in FIG. 5. The process 500 includes obtaining (510) device capabilities. Compatible hosted applications are determined (512) and, in several embodiments, hosted application offer data is formatted (514). Hosted application offer data is transmitted (516).

In many embodiments, computing device capabilities are obtained (510) from a computing device utilizing techniques including (but not limited) to any of the techniques described above. The obtained (510) computing device capabilities include a variety of data, including metadata describing the capabilities of one or more computing devices and/or user profile data. In a number of embodiments, at least one compatible hosted application is determined (512) based on the computing device capabilities and metadata describing the properties of the hosted applications. In several embodiments, determining (512) at least one compatible hosted application includes computing a score for a portion of the hosted applications contained within a hosted application marketplace based on metadata describing each hosted application and the obtained (510) computing devices. A variety of other factors, including hosted applications previously obtained by one or more computing devices associated with user profile data within the obtained (510) device capabilities, previous presentations of the hosted application offer data, the location of the computing device and/or user profile data, and the intended display format for the hosted application offer data, can be utilized in the computation of the score as appropriate to a specific application in embodiments of the invention.

In many embodiments, the application offer data is formatted (514) hosted application offer data can be formatted for display within a particular computing environment. In certain embodiments, formatting (514) hosted application offer data includes identifying determined (512) compatible hosted applications with a score exceeding a particular threshold; this threshold can be absolute and/or relative to the other calculated scores. The hosted application offer data can be formatted (514) in accordance with the requirements of one or more languages, including using HTML, XML, JavaScript, or any other language as appropriate to a specific application in embodiments of the invention. In a variety of embodiments, the formatting (514) of the hosted application offer data is based on the recipient of the hosted application offer data. In particular, the formatted (514) hosted application offer data can instruct a computing device to display the hosted application offer data within a particular region displayed on the computing device. The format of the hosted application offer data can take a variety of forms as appropriate to a specific application in accordance with embodiments of the invention, including, but not limited to, rows of icons (with or without rating information), groups of hosted applications identified by a category associated with each hosted application, and a listing of the compatible hosted applications. In a number of embodiments, the hosted application offer data is formatted (514) to perform comparative (e.g. A/B) testing of different hosted application offer data layouts. In a variety of embodiments, the hosted application offer data is formatted (514) based on the results of comparative testing. The results of the comparative testing can be based on computing devices with capabilities similar to those of the target computing device, although the results of any testing (comparative or otherwise) can be utilized as appropriate to a specific application in accordance with embodiments of the invention. The hosted application offer data can be transmitted (516) to one or more computing devices. In several embodiments, the hosted application offer data is transmitted (516) to computing devices identified in the obtained (510) device capabilities.

Although specific processes for determining compatible hosted applications are discussed above with respect to FIG. 5, a variety of processes, including those that determine compatible applications other than hosted applications for a variety of computing devices, can be utilized as appropriate to a specific application in embodiments of the invention. Processes for identifying and transmitting hosted applications in accordance with embodiments of the invention are described in more detail below.

Determining Compatible Hosted Applications based on User Data

Figure 6:
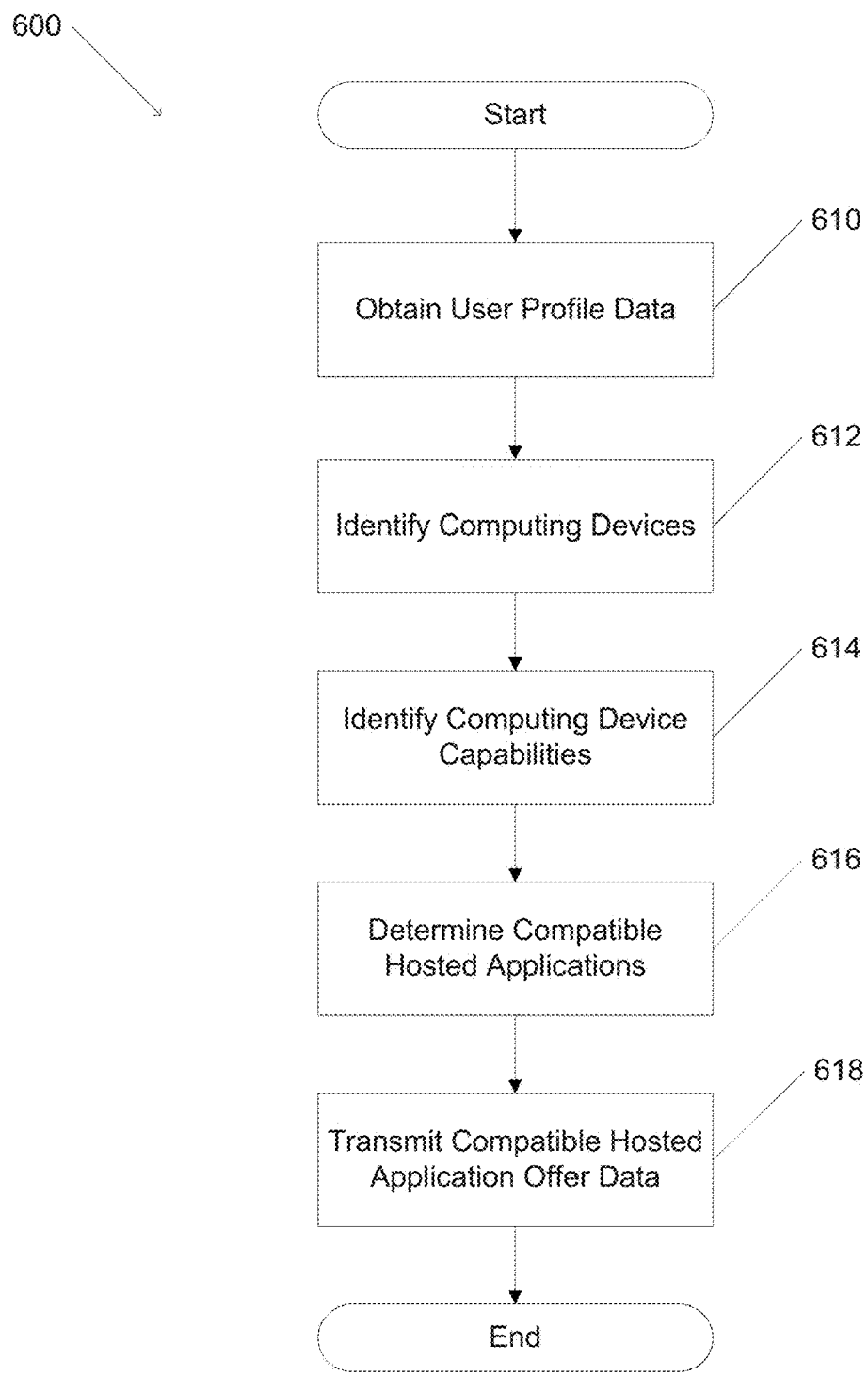
FIG. 6 is a flowchart of a process for determining compatible hosted applications based on user profile data in accordance with an embodiment of the invention.

A user may be associated with one or more computing devices. For example, a user may have a personal computer, a tablet, and a mobile phone. Hosted application marketplaces can be configured to provide the user with a selection of hosted applications that are compatible with one or more of the computing devices associated with the user. Hosted application marketplace server systems in accordance with embodiments of the invention are configured to identify computing devices associated with a user and transmit data describing compatible hosted applications to one or more of the computing devices. In certain embodiments, determining compatible hosted applications based on user profile data is similar to the process described above with respect to FIG. 5 but with the exception that the determination of compatible devices is based on the user profile data. A process for determining compatible hosted applications based on user profile data in accordance with an embodiment of the invention is conceptually illustrated in FIG. 6. The process 600 includes obtaining (610) user profile data. Computing devices are identified (612) and computing device capabilities are identified (614). Compatible hosted applications are determined (616). Compatible hosted application offer data is transmitted (618).

User profile data can be obtained (610) from a number of sources, including a computing device and/or provided as part of accessing a hosted application marketplace. A variety of metadata can be included in the obtained (610) user profile data, such as hosted applications and applications other than hosted applications obtained by a user associated with the user profile data. The hosted applications (and/or other applications) can be obtained via a hosted application marketplace and/or from server systems external to the hosted application marketplace. Other metadata, including user profile data as described above, can also be utilized as appropriate to a specific application in accordance with embodiments of the invention. In a variety of embodiments, the obtained (610) user profile data identifies (612) one or more computing devices associated with the obtained (610) user profile data. In many embodiments, computing device capabilities can be identified (614) based on the identified (612) computing devices utilizing techniques similar to those described above. Furthermore, compatible hosted applications can also be determined (616) utilizing techniques similar to those described above. In many embodiments, the transmitted (618) hosted application offer data is formatted utilizing techniques similar to those described above. In certain embodiments, compatible hosted application offer data describing the determined (616) compatible hosted applications is transmitted (618) to one or more of the identified (612) computing devices in a manner similar to the techniques outlined above.

Although specific processes for determining compatible hosted applications based on user profile data are discussed above with respect to FIG. 6, a variety of processes can be utilized as appropriate to a specific application in embodiments of the invention. Processes for transmitting hosted applications in accordance with embodiments of the invention are described in more detail below.

Transmitting Hosted Applications

Figure 7:
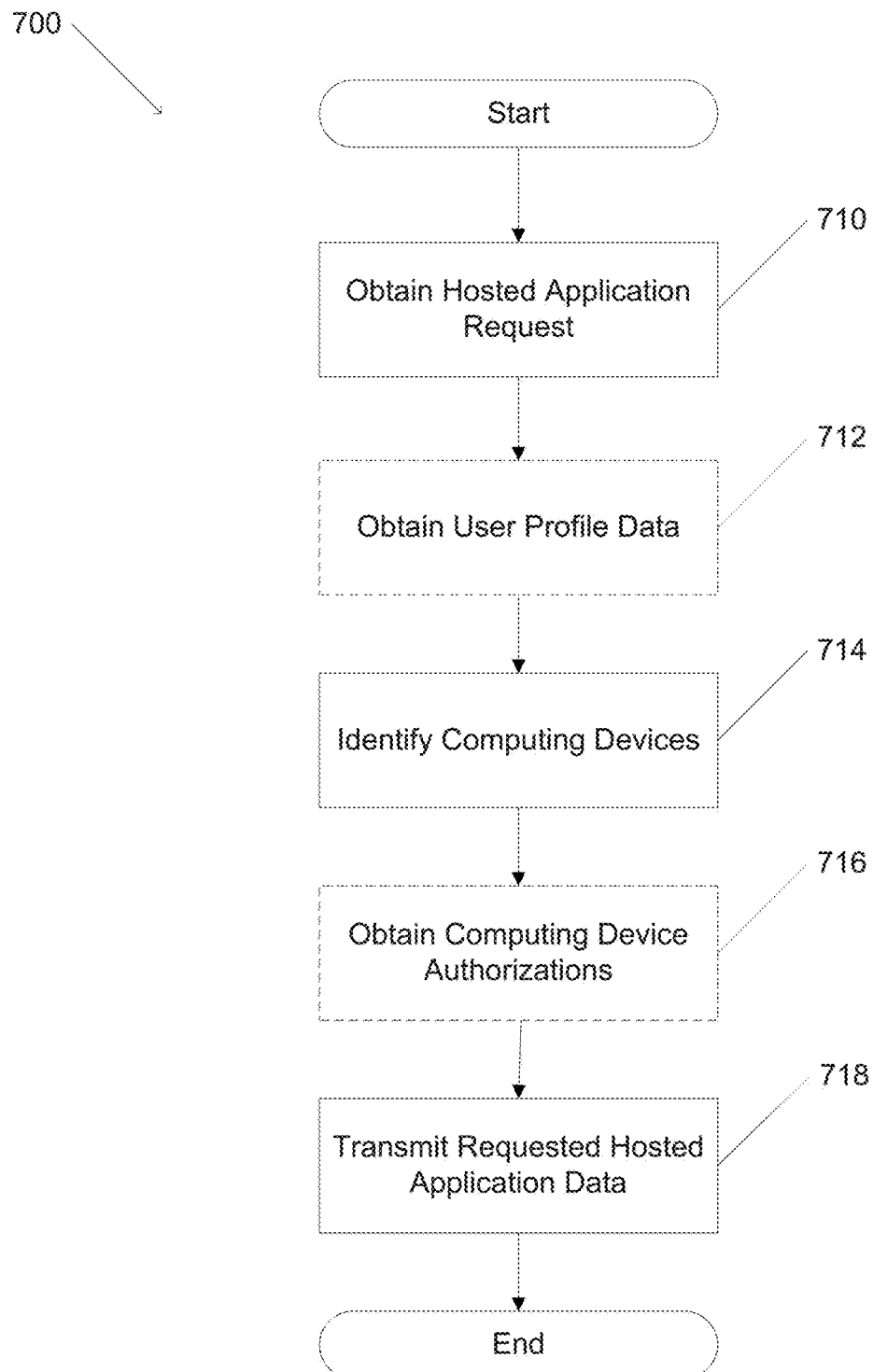
FIG. 7 is a flowchart of a process for transmitting hosted applications in accordance with an embodiment of the invention.

Hosted application marketplaces allow the user to identify a hosted application and receive the hosted application (and/or an installer for the hosted application) across one or more of the computing devices associated with the user. Hosted application marketplace server systems in accordance with embodiments of the invention can be configured to transmit hosted applications (and/or metadata describing the hosted applications) to one or more computing devices. A process for transmitting hosted applications in accordance with an embodiment of the invention is conceptually illustrated in FIG. 7. The process 700 includes obtaining (710) a hosted application request. In a number of embodiments, user profile data is obtained (712). Computing devices are identified (714) and, in a number of embodiments, computing devices are authorized (716). Hosted application data is transmitted (718). The hosted application data can include hosted applications, installers configured to install a hosted application on a computing device, and/or metadata describing hosted applications that can be installed on specific computing device as appropriate to a specific application in embodiments of the invention.

In certain embodiments, the hosted application request is obtained (710) from a computing device. In many embodiments, the obtained (710) hosted application request identifies one or more hosted applications. The obtained (710) hosted application request can include user profile data. In a variety of embodiments the obtained (712) user profile data identifies one or more computing devices associated with the hosted application request. Computing devices can be identified (714) utilizing the hosted application request and/or the obtained (712) user profile data. In certain embodiments, once the computing devices are identified the system can determine the hosted applications that are supported by each of the computing devices.

Computing device authorizations identify one or more computing devices that are allowed to obtain a hosted application. In several embodiments, the computing device authorizations are obtained via the hosted application marketplace. The computing device authorizations can be obtained from a user (e.g. associated with a user profile) and/or provided by each of the computing devices. In a number of embodiments, the computing device authorizations are obtained (716) via the obtained (710) hosted application request and/or the obtained (712) user profile data. In certain embodiments, the hosted application marketplace server system maintains a database of provided device authorizations that can be consulted to obtain (716) the device authorizations. Other techniques can be utilized to obtain (716) computing device authorizations as appropriate to a specific application in embodiments of the invention.

In many embodiments, the transmitted (718) hosted applications are selected based on the identified (714) computing devices and/or the obtained (710) hosted application request. In a variety of embodiments, the transmitted (718) hosted applications are tailored to the capabilities of the computing device receiving the transmitted (718) requested hosted application. Requested hosted applications can be transmitted (718) to one or more computing devices as identified in the obtained (710) hosted application request and/or the obtained (712) user profile data. In several embodiments, hosted applications are only transmitted (718) to computing devices where authorizations have been obtained (716). In a number of embodiments, hosted applications are directly transmitted (718) to a computing device. In many embodiments, an installer for a hosted application is transmitted (718) to a computing device.

Although specific processes for transmitting hosted applications are discussed above with respect to FIG. 7, a variety of processes, including those that transmit applications other than hosted applications, can be utilized as appropriate to a specific application in embodiments of the invention. Additionally, any of the various processes described above can be performed in alternative sequences and/or in parallel (on different computing devices) in order to achieve similar results in a manner that is more appropriate to the requirements of a specific application.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A hosted application marketplace server system, comprising:
a processor; and
a memory readable by the processor and storing instructions;
wherein the instructions, when read by the processor, direct the processor to:
obtain request data describing a request for hosted application data, wherein the request data comprises user profile data and computing device capability data;
identify a computing device based on the request data;
determine compatible application data based on the request data, wherein the compatible application data identifies a set of applications that are compatible with the computing device based on the computing device capability data;
generate hosted application data based on the compatible application data, wherein:
the hosted application data comprises a background page containing a first set of instructions;
parsing of the first set of instructions causes downloading of at least one text file containing a second set of instructions, wherein:
the first set of instructions is used to modify the at least one text file; and
a rendering engine layer is configured to render a user interface page based upon the modified text file;
and
transmit the hosted application data in response to the obtained request data.

2. The system of claim 1, wherein the at least one text file is modified by removing a portion of content from the at least one text file.

3. The system of claim 1, wherein the at least one text file is modified by adding a portion of content from the at least one text file.

4. The system of claim 1, wherein:
the at least one text file further comprises a Cascading Style Sheet (CSS); and
the at least one text file is modified by modifying the CSS within the at least one text file in accordance with a predetermined page modification rule.

5. The system of claim 4, wherein modification of the CSS within the at least one text file in accordance with a predetermined page modification rule comprises inserting a CSS into the at least one text file.

6. The system of claim 4, wherein modification of the CSS within the at least one text file in accordance with a predetermined page modification rule comprises removing a CSS into the at least one text file.

7. The system of claim 1, wherein the at least one text file is remotely hosted.

8. The system of claim 1, wherein the modified text file is used to build a document object model (DOM) and the rendering engine layer is configured to render the user interface page based upon the DOM.

9. The system of claim 8, wherein the DOM is modified in accordance with a predetermined DOM modification rule to create a modified DOM and the rendering engine layer is configured to render the user interface page based upon the modified DOM.

10. The system of claim 9, wherein an integration layer integrates the user interface page with functionalities of the computing device.

11. A method for providing applications from a hosted application marketplace to a computing device, the method comprising:
obtaining request data describing a request for hosted application data, wherein the request data comprises user profile data and computing device capability data;
identifying a computing device based on the request data;
determining compatible application data based on the request data, wherein the compatible application data identifies a set of applications that are compatible with the computing device based on the computing device capability data;

generating hosted application data based on the compatible application data, wherein:
  the hosted application data comprises a background page containing a first set of instructions;
  parsing of the first set of instructions causes downloading of at least one text file containing a second set of instructions, wherein:
    the first set of instructions is used to modify the at least one text file; and
    a rendering engine layer is configured to render a user interface page based upon the modified text file;
  and
  interpretation of the second set of instructions in the rendering language contained within the at least one remotely hosted file by a rendering engine layer causes the rendering engine layer to render pages forming a user interface;
and
transmitting the hosted application data in response to the obtained request data.

12. The method of claim 11, wherein the at least one text file is modified by removing a portion of content from the at least one text file.

13. The method of claim 11, wherein the at least one text file is modified by adding a portion of content from the at least one text file.

14. The method of claim 11, wherein:
  the at least one text file further comprises a Cascading Style Sheet (CSS); and
  the at least one text file is modified by modifying the CSS within the at least one text file in accordance with a predetermined page modification rule.

15. The method of claim 14, wherein modification of the CSS within the at least one text file in accordance with a predetermined page modification rule comprises inserting a CSS into the at least one text file.

16. The method of claim 14, wherein modification of the CSS within the at least one text file in accordance with a predetermined page modification rule comprises removing a CSS into the at least one text file.

17. The method of claim 11, wherein the at least one text file is remotely hosted.

18. The method of claim 15, wherein the modified text file is used to build a document object model (DOM) and the rendering engine layer is configured to render the user interface page based upon the DOM.

19. The method of claim 18, wherein the DOM is modified in accordance with a predetermined DOM modification rule to create a modified DOM and the rendering engine layer is configured to render the user interface page based upon the modified DOM.

20. The method of claim 19, wherein an integration layer integrates the user interface page with functionalities of the computing device.

* * * * *